UNITED STATES PATENT OFFICE.

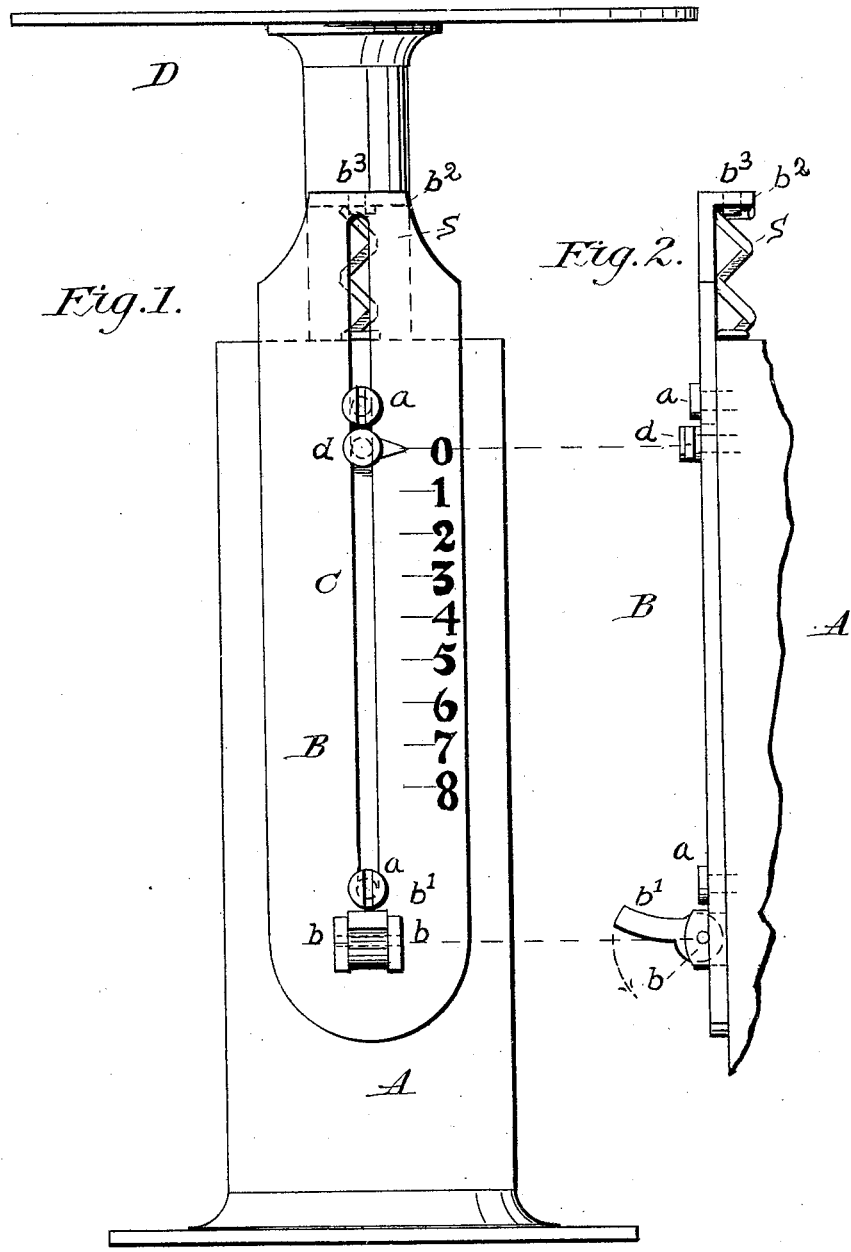

WILLIAM T. ROBERTSON, OF MONTGOMERY, ALABAMA.

TARE-INDICATING INDEX-PLATE FOR SCALES.

SPECIFICATION forming part of Letters Patent No. 647,524, dated April 17, 1900.

Application filed August 30, 1899. Serial No. 728,946. (No model.)

*To all whom it may concern:*

Be it known that I, WILLIAM T. ROBERTSON, a citizen of the United States of America, residing at Montgomery, in the county of Montgomery and State of Alabama, have invented certain new and useful Improvements in Tare-Indicating Index-Plates for Scales, of which the following is a specification, reference being had to the accompanying drawings, forming a part thereof.

My invention relates to that class of scale index-plates provided with means of adjusting same after first weighing an empty vessel, so that when said vessel is replaced on the scale after being filled with the article to be weighed the scale will indicate the net weight of the contents of said vessel, allowing for the tare or weight of containing vessel by the first operation.

The object of my invention is to provide an efficient and simple form of index-plate for such scales which will be easy to operate with the minimum of attention and which after use as above described will automatically return to its original or normal position when released from a holding device.

I am aware that scales provided with tare-indicating indices or dials have been heretofore patented, and I do not herein claim the invention of such a scale, but only the special means hereinbelow set forth for attaining the objects set forth.

Referring to the accompanying drawings, Figure 1 shows a scale of the form having a spring-counterpoise which by its compression or expansion indicates with a sliding pointer or index the weight of articles placed on its platform or pan and shows my indicating-plate attached to the front thereof. Fig. 2 shows a side view of such indicating-plate and the manner of its attachment to the front of the scale.

A, Fig. 1, is a scale of the form above described in which a pointer $d$, protruding through a slot in the front face of the scale, indicates the degree of compression or expansion of a spring in said scale concealed, and hence the weight upon the pan D, as is usual with this form of scale.

B is my index-plate, having a slot C and slidably attached to the front face of A by means of studs or screws $a\,a$, passing through said slot C. Said plate B is provided with a scale of figures, shown at the right thereof. The pointer $d$ extends also through slot C in B and is adapted to indicate weights on the column of index-figures upon B.

Fig. 2 shows a side view of B as attached to the front face of the scale-box A. At the upper end of B is a backward-extending lug or arm $b^2$, having a downwardly-extending stud $b^3$, adapted to hold in compression between said lug $b^2$ and the top of A a spring $s$, which tends to force index-plate B upward until its motion is stopped by lower stud $a$ against the lower end of slot C.

$b\,b$ are lugs extending out from face of B, and between them is journaled a cam $b'$ (Figs. 1 and 2,) adapted when forced down, as shown by the dotted arrow in Fig. 2, to engage the face of A through a suitable opening, as indicated by dotted lines in Fig. 2, and thus serve as a brake or stop to fasten B in any position in its vertical motion in which it may be placed.

The method of operation is as follows: An empty vessel having been placed upon the scale-pan D, the pointer is depressed until the scale comes to equilibrium with pointer, indicating some figure or fraction upon B. B is then slid downward until the pointer again indicates zero and fixed in position by depressing the cam. The vessel can be then removed and the articles desired to be weighed placed therein, when on replacing vessel on scale-pan the pointer will indicate on the scale of figures on B the net weight of the contents of said vessel, having allowed for the tare or weight of containing vessel by the first operation. After using, as described, the index-plate is returned automatically to its original position on releasing the cam.

It is obvious that a spring or weight returning device would answer equally as well and that the invention hereinabove described would apply with equal effect to circular revoluble dials as well and would be an equivalent with such dials to the invention as relating to sliding index-plates.

Having described my invention, what I claim is—

1. In a tare-indicating mechanism for scales the combination of the slotted movable index-plate B, adapted to move in the direction of travel of the pointer $d$, the cam $b'$, and the spring $s$, adapted to force said plate B upward, substantially as described.

2. In a tare-indicating mechanism for scales the combination of an index-plate movable along the path of the indicating-point, a cam adapted to lock said plate in any position of its travel, and a spring adapted to return said plate to its normal position when said cam is released, substantially as described.

3. The combination of a tare-indicating index-plate for scales adapted to be moved along the path of the indicating-pointer of said scales, a cam adapted to lock said indicating-plate in any position of its travel, and a spring adapted to return said plate to its normal zero position, substantially as described.

WILLIAM T. ROBERTSON.

Witnesses:
D. W. TROT,
DAVID W. W. FULLER.